Patented Dec. 18, 1923.

1,477,870

UNITED STATES PATENT OFFICE.

CARLETON ELLIS, OF MONTCLAIR, NEW JERSEY.

ARTIFICIAL RESIN AND METHOD OF PREPARATION.

No Drawing.  Application filed December 26, 1922. Serial No. 609,135.

*To all whom it may concern:*

Be it known that I, CARLETON ELLIS, a citizen of the United States, and a resident of Montclair, in the county of Essex and State of New Jersey, have invented certain new and useful Improvements in Artificial Resins and Methods of Preparation, of which the following is a specification.

This invention relates to resinous material obtained by the reaction between phenols or phenoloid bodies and butyl aldehyde with or without the presence of furfural.

Aldehydes possess different powers of resinification with phenolic substances and require different catalysts for their preparation. Hence it is impossible to predict definitely the results to be obtained by using any particular combination of phenols and aldehydes. Some phenolic substances will not resinify with aldehydes but tend rather to form oils or cystalline substances. In the present invention it is an object to prepare a resin from butyl aldehyde and ordinary phenol, cresols or phenoloid bodies. Butyl aldehyde does not combine with phenol readily in the presence of alkaline catalysts such for example as potassium carbonate but will form a resin in the presence of acids, more particularly strong mineral acids such as hydrochloric acid. The protracted heating of phenol and butyl aldehyde in molecular proportions in the presence of a small amount of hydrochloric acid yields a soft resin.

For example 47 parts by weight of phenol and 36 parts of butyl aldehyde with the addition of one part of concentrated hydrochloric acid were heated under a reflux condenser in an oil bath for 4 hours. The oil bath was maintained at 150° C. On allowing the reaction mixture to cool approximately 5 parts of water separated. A brown soft highly viscous resinous substance was obtained which on further heating increased in consistency and became harder.

By decreasing or increasing the proportion of butyl aldehyde products of different quality are obtained.

In another case 1 molecular proportion of phenol to ½ mol. of butyl aldehyde was likewise heated in the presence of a hydrochloric acid catalyst. When the reaction had progressed to a sufficient degree ¼ mol. of furfural was added and sufficient potassium carbonate to render the mixture alkaline. The heating was continued at about 150° until the furfural had combined forming a black resinous complex.

Of course the catalyst may be removed if desired at the close of the operation by suitable washing treatment, by neutralization or in any other manner.

Formaldehyde, paraform, hexamethylenetetramine and various other similar substances may be incorporated with the resin, likewise fillers such as asbestos or mineral powders, wood flour and the like. Such compositions may be used for molding purposes. Solutions of the resin in appropriate solvents may be employed as varnishes or for cements or for impregnating paper, wood pulp and the like to produce plastic products, sheet material etc. The molding operation may be carried out under heat and pressure or the process of cold molding may be employed in some cases.

What I claim is:—

1. A resinous composition prepared from butyl aldehyde and a phenolic body.

2. A resinous substance prepared from butyl aldehyde, furfural and a phenolic body.

3. The process of making a resin which comprises heating phenol and butyl aldehyde with an acid catalyst.

4. The process of making a resin which comprises heating phenol and butyl aldehyde with an acid catalyst and reacting on the product with furfural in the presence of an alkaline catalyst.

5. A resinous substance comprising a butyl aldehyde, phenol resin incorporated with hexamethylenetetramine and filling material.

CARLETON ELLIS.